US012040143B2

(12) United States Patent
Cernat et al.

(10) Patent No.: US 12,040,143 B2
(45) Date of Patent: Jul. 16, 2024

(54) DIVIDING A HEATING VOLUME OF A POWER CIRCUIT

(71) Applicant: Siemens Energy Global GmbH & Co. KG, Munich (DE)

(72) Inventors: Radu-Marian Cernat, Berlin (DE); Thomas Chyla, Berlin (DE); Frank Reichert, Weissenfels (DE); Joerg Teichmann, Dallgow-Doeberitz (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 190 days.

(21) Appl. No.: 17/639,983

(22) PCT Filed: Aug. 12, 2020

(86) PCT No.: PCT/EP2020/072589

§ 371 (c)(1),
(2) Date: Mar. 3, 2022

(87) PCT Pub. No.: WO2021/043549

PCT Pub. Date: Mar. 11, 2021

(65) Prior Publication Data

US 2022/0293366 A1 Sep. 15, 2022

(30) Foreign Application Priority Data

Sep. 3, 2019 (DE) ..................... 10 2019 213 344.4

(51) Int. Cl.
*H01H 33/53* (2006.01)
*H01H 33/86* (2006.01)

(52) U.S. Cl.
CPC ............. *H01H 33/53* (2013.01); *H01H 33/86* (2013.01)

(58) Field of Classification Search
CPC .... H01H 33/86; H01H 33/703; H01H 33/901; H01H 33/903; H01H 33/53;
(Continued)

(56) References Cited

U.S. PATENT DOCUMENTS 4,684,773 A 8/1987 Niemeyer
8,299,385 B2 * 10/2012 Bae ........................ H01H 33/70 218/66

(Continued)

FOREIGN PATENT DOCUMENTS

DE 3440212 A1 4/1986
DE 19547522 C1 1/1997

(Continued)

OTHER PUBLICATIONS

Translation of DE19850395 (Original document published May 4, 2000) (Year: 2000).*

*Primary Examiner* — William A Bolton
(74) *Attorney, Agent, or Firm* — Laurence A. Greenberg; Werner H. Stemer; Ralph E. Locher

(57) ABSTRACT

A separating wall for dividing a heating volume of a power circuit into a first sub-volume and a second sub-volume. The separating wall is formed with at least one wall opening which allows a flow of gas between the sub-volumes. The wall opening has an aerodynamically active opening surface based on a pressure difference between a pressure in the first sub-volume and a pressure in the second sub-volume.

12 Claims, 1 Drawing Sheet

(58) Field of Classification Search
CPC .. H01H 2033/908; H01H 33/56; H01H 33/72; H01H 203/888
USPC ....... 218/155, 13, 45, 47, 51, 53, 55–57, 61, 218/63, 66, 68, 72, 85, 86, 88
See application file for complete search history.

(56) References Cited

U.S. PATENT DOCUMENTS

| | | | | |
|---|---|---|---|---|
| 8,664,558 | B2 * | 3/2014 | Bose | H01H 33/88 218/51 |
| 8,779,316 | B2 * | 7/2014 | Drews | H01H 33/74 218/51 |
| 8,816,237 | B2 * | 8/2014 | Dufournet | H01H 33/905 218/54 |
| 8,822,868 | B2 | 9/2014 | Kehr et al. | |
| 9,251,981 | B2 * | 2/2016 | Cernat | H01H 33/58 |
| 9,496,107 | B2 * | 11/2016 | Kim | H01H 33/90 |
| 10,685,798 | B2 | 6/2020 | Cernat et al. | |
| 2010/0326958 | A1 | 12/2010 | Gregoire et al. | |
| 2014/0014623 | A1 | 1/2014 | Kehr et al. | |
| 2015/0194280 | A1 * | 7/2015 | Uchii | H01H 33/7023 218/63 |
| 2018/0277323 | A1 * | 9/2018 | Sakuyama | H01H 33/82 |
| 2018/0342363 | A1 * | 11/2018 | Ozil | H01H 33/703 |
| 2019/0180963 | A1 | 6/2019 | Cernat et al. | |

FOREIGN PATENT DOCUMENTS

| | | | |
|---|---|---|---|
| DE | 19850395 | A1 | 5/2000 |
| EP | 0177714 | A2 | 4/1986 |
| EP | 0308626 | A2 | 3/1989 |
| EP | 0783173 | A1 | 7/1997 |
| EP | 1796119 | A1 | 6/2007 |
| WO | WO 2012123032 | A1 | 9/2012 |
| WO | WO 2018024435 | A1 | 2/2018 |
| WO | WO 2019121732 | A1 | 6/2019 |

* cited by examiner

DIVIDING A HEATING VOLUME OF A POWER CIRCUIT

FIELD AND BACKGROUND OF THE INVENTION

The invention relates to a separating wall for dividing a heating volume of a power circuit, in particular of a self-compressing power circuit, and to a method for producing a separating wall of this type.

A power circuit serves for opening and closing a current path, in particular so as to protect against overload currents and short circuit currents. A power circuit typically has two arcing contact elements which when opening and closing the current path are moved relative to one another and between which an arc is ignited in an arc space when the current path is opened.

A self-compressing power circuit, also referred to as a sulfur hexafluoride circuit breaker, is filled with an extinguisher gas, for example with sulfur hexafluoride, and utilizes part of the energy released in the arc for building up an extinguishing pressure for extinguishing the arc, as a result of which said self-compressing power circuit requires less operating energy in comparison to dual-nozzle power circuits, for example. When the current path is opened, an arc is ignited between the arc contacts, said arc when exceeding a geometry-specific minimum amperage completely closing an isolating nozzle constriction. The arc space by way of a heating duct is connected to a separate heating volume in which the extinguishing pressure is generated as a result of hot gas flowing in from the arc space and said hot gas mixing with the cold gas in the heating volume.

With a view to a more effective buildup of extinguishing pressure, the heating volume in a suitable manner is often separated into two sub-volumes. In the case of low currents (operating currents, partial loads), the smaller of the sub-volumes is predominantly utilized for building up the extinguishing pressure, and in the case of high currents, the entire heating volume is utilized for building up of the extinguishing pressure.

In the prior art, the separation of the heating volume today takes place by way of a so-called separating cylinder which connects the two sub-volumes by way of permanent openings (for example, simple bores).

SUMMARY OF THE INVENTION

The invention is based on the object of enabling a heating volume of a power circuit to be divided into two sub-volumes in an improved manner.

This object is achieved according to the invention by a separating wall as claimed, by a method for producing a separating wall of this type as claimed, and by a power circuit as claimed.

Advantageous design embodiments of the invention are the subject matter of the dependent claims.

A separating wall according to the invention for dividing a heating volume of a power circuit into a first sub-volume and a second sub-volume comprises at least one wall opening which enables a gas flow between the sub-volumes, and has an aerodynamically effective opening area which is a function of a pressure differential between a pressure in the first sub-volume and a pressure in the second sub-volume.

The aerodynamically effective opening area of a wall opening here is understood to be an effective cross-sectional area of the wall opening which is defined, for example, as a product of a geometric (actual) opening area of the wall opening and an opening-specific outflow factor. The outflow factor of a wall opening takes into account the flow resistances such as the shaping of the wall opening, installations in the wall opening or the type and/or frequency of the change of direction of a flow through the wall opening.

A separating wall according to the invention enables the heating gas flowing from the arc space into the heating volume to be divided into two sub-volumes of the heating volume as a function of a pressure of the heating gas through special wall openings in the separating wall, the aerodynamically effective opening area of said wall openings being a function of the pressure differential between the sub-volumes. As a result thereof, dividing the heating gas between the two sub-volumes is enabled so as to take into account the pressure of the heating gas and the intensity of the arc. For example, it can be achieved that the heating gas at relatively small pressure differentials makes its way substantially only into a first of the two sub-volumes, such that no losses or only minor losses in terms of heating gas arise in the first sub-volume, as a result of which the build-up of extinguishing pressure in the first sub-volume, and thus the extinguishing capability is improved. As the pressure differential increases, more and more heating gas makes its way from the first sub-volume into the second sub-volume, wherein the flow from the first sub-volume into the second sub-volume is a function of the pressure differential as well as of the aerodynamically effective opening area of the at least one wall opening. As opposed to wall openings which have aerodynamically effective opening areas that are not a function of pressure, a flow of the extinguishing gas can thus be effected from the first sub-volume into the second sub-volume, said flow being a function of the pressure differential directly as well as indirectly by way of the aerodynamically effective opening areas of the wall openings. This enables the extinguishing gas pressure in the heating volume to be built up in a manner readily adaptable to the intensity of the arc.

In one embodiment, the separating wall comprises at least one opening closure by way of which a wall opening is able to be at least partially closed, the opening state of said opening closure being a function of the pressure differential.

In one further embodiment, at least one opening closure, by way of a spring element, by which a restoring force as a function of the pressure differential is able to be exerted on the opening closure, is coupled to a separating wall region of the separating wall which is adjacent to the wall opening that is able to be at least partially closed by the opening closure.

In one further embodiment, the spring element comprises a spring or a valve flap made of metal, or at least one correspondingly resilient plastics material part.

In one further embodiment, at least one opening closure by way of an elastic connection region is connected to a separating wall region of the separating wall which is adjacent to the wall opening that is able to be at least partially closed by the opening closure.

In one further embodiment, at least one wall opening is configured as a meandering flow duct between the sub-volumes.

In one further embodiment, at least one meandering flow duct has a flow resistance element which by way of a gas flow flowing in the flow duct is able to be elastically deflected.

In one further embodiment, the separating wall furthermore has at least one wall reinforcement which is made from a reinforcement material which is of a greater strength than the surrounding material in which the wall reinforcement is embedded.

Such a wall reinforcement or insert stabilizes the construction and enables savings in terms of material, optimization in terms of space, more space for the extinguishing gas, and an effective enlargement of the heating volume.

In one further embodiment, the separating wall has a substantially hollow-cylindrical shape, thus is formed as separating cylinder.

In one further embodiment, at least external surfaces of the separating wall are made from polytetrafluoroethylene.

According to one aspect of the present invention, the separating wall is produced by means of 3-D printing.

In this way, shapes can be implemented which cannot be produced by conventional technology.

In one embodiment, the separating wall is printed onto a carrier component. In this way, the number of individual parts is reduced and the assembly is facilitated.

The invention furthermore relates to a power circuit having a separating wall as described above, wherein the separating wall divides a heating volume into two sub-volumes.

The properties, features and advantages of this invention described above, and the manner in which said properties, features and advantages are achieved, will become clearer and more evident in the context of the description hereunder of exemplary embodiments which are explained in more detail in conjunction with the drawings, in which:

Equivalent parts are provided with the same reference signs in the figures.

DETAILED DESCRIPTION OF THE INVENTION

Figure 1:
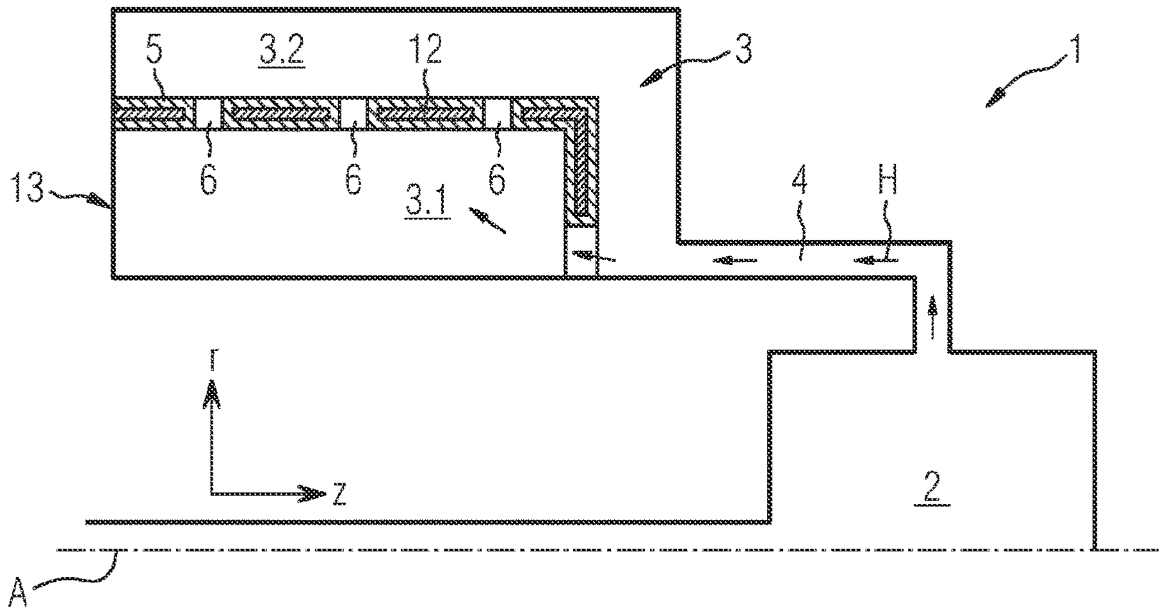
FIG. 1 shows a schematic sectional illustration of a power circuit.

FIG. 1 is a schematic sectional illustration of a power circuit 1 in the region of an arc space 2. In the arc space 2, an arc is ignited between two arc contact elements (not illustrated) which are moved relative to one another when a current path is opened and closed. For example, a first arc contact element is a pin-type pin element, and a second arc contact element is a tubular element having an opening into which the pin element is moved when closing the current path, and out of which the pin element is moved when opening the current path.

The power circuit 1 can be configured as a self-compressing power circuit which converts the energy released in the arc for the purpose of building up extinguishing pressure, as a result of which said self-compressing power circuit requires less operating energy in comparison to a dual-nozzle power circuit. During a switching-off procedure, that is to say when opening the current path, an arc is ignited between the arc contact elements, said arc when exceeding a geometry-specific minimum amperage completely closing an isolating nozzle constriction. The arc space 2 by way of a heating duct 4 is connected to a separate heating volume 3 in which an extinguishing pressure is generated by hot gas flowing in from the arc space 2 and said hot gas mixing with the cold gas in the heating volume 3. The arrows indicate directions of a gas flow H of the gas. The arc space 2 and the heating volume 3 are configured so as to be substantially rotationally symmetrical in relation to a rotation axis A, the arc contact elements being moved relative to one another along said rotation axis A. The rotation axis A here runs through the arc space 2, and the heating volume 3 is a volume which is disposed about the rotation axis A so as to be spaced apart from said rotation axis A in a radial direction r.

With a view to a more effective build-up of extinguishing pressure, the heating volume 3 in a suitable manner is separated into two sub-volumes 3.1, 3.2. In the case of low currents (operating currents, partial loads) a first sub-volume 3.1 can be primarily used for building up extinguishing pressure, and in the case of high currents the entire heating volume 3 can be utilized for building up extinguishing pressure.

The separation of the heating volume 3 in the prior art takes place by a separating wall 5, in particular a so-called separating cylinder, which has permanent wall openings 6 (for example, simple bores) which connect the two sub-volumes 3.1, 3.2.

Figure 2:
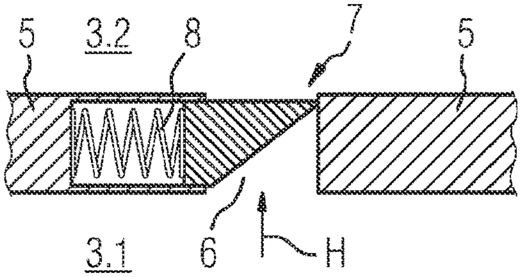
FIG. 2 shows a schematic sectional illustration of a first embodiment of a separating wall according to the invention for a power circuit in the region of a wall opening.
Figure 3:
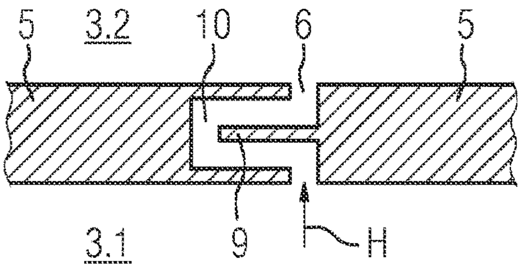
FIG. 3 shows a schematic sectional illustration of a second embodiment of a separating wall according to the invention for a power circuit in the region of a wall opening.
Figure 4:
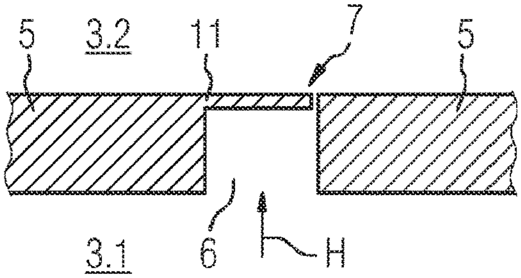
FIG. 4 shows a schematic sectional illustration of a third embodiment of a separating wall according to the invention for a power circuit in the region of a wall opening.

Embodiments of the separating wall 5 according to the invention in the region of wall openings 6 are shown in FIGS. 2 to 4. These wall openings 6 have in each case one aerodynamically effective opening area which is a function of a pressure differential between a pressure in the first sub-volume 3.1 and a pressure in the second sub-volume 3.2. The pressure differential is defined as the result of the subtraction of the pressure in the second sub-volume 3.2 from the pressure in the first sub-volume 3.1. Extinguishing gas heated by an arc in the arc space 2 by way of the heating duct 4 initially flows predominantly into the first sub-volume 3.1 of the heating volume 3. From there, part of the extinguishing gas flows into the second sub-volume 3.2, wherein the flow from the first sub-volume 3.1 into the second sub-volume 3.2 increases as the pressure differential increases, and as the aerodynamically effective opening areas of the wall openings 6, which increase along with the pressure differential, increase.

A separating wall 5 according to the invention can furthermore have at least one wall reinforcement 12 which is made from a reinforcement material which is of a greater strength than the surrounding material in which the wall reinforcement is embedded. The surrounding material is, for example, polytetrafluoroethylene and forms in particular the external surfaces of the separating wall. The surrounding material and the reinforcement material are electrically non-conducting materials.

The separating wall 5 has a substantially hollow-cylindrical shape, the cylinder axis thereof coinciding with the rotation axis A.

FIG. 2 is a schematic sectional illustration of a first embodiment of a separating wall 5 according to the invention for a power circuit 1 in the region of a wall opening 6. The separating wall 5 has an opening closure 7 by way of which the wall opening 6 is able to be at least partially closed, the opening state of said opening closure 7 being a function of the pressure differential.

The opening closure 7, by way of a spring element 8, by which a restoring force which is a function of the pressure differential is able to be exerted on the opening closure 7, is coupled to a separating wall region of the separating wall 5 which is adjacent to the wall opening 6 that is able to be at least partially closed by the opening closure 7.

The spring element 8 can comprise a spring or a valve flap of metal, or at least one correspondingly resilient plastics material part. In the embodiment shown, the opening closure 7 comprises a wedge-shaped element which has a face lying obliquely in the gas flow H such that the wedge-shaped element as a result of the gas flow H, counter to the force of the spring element 8, is displaced transversely to the gas flow H. The higher the pressure differential, the more the opening closure 7 is opened, and the larger thus the aerodynamically effective opening area of the wall opening 6.

FIG. 3 is a schematic sectional illustration of a second embodiment of a separating wall 5 according to the invention for a power circuit 1 in the region of a wall opening 6. The wall opening 6 is configured as a meandering flow duct 10 between the first sub-volume 3.1 and the second sub-volume 3.2. The flow duct 10 can have a flow resistance element 9 which by way of the gas flow H flowing in the flow duct 10 is able to be elastically deflected. The higher the pressure differential, the higher the gas flow through the flow duct 10, and the larger thus the aerodynamically effective opening area of the wall opening 6 formed by the flow duct 10.

FIG. 4 is a schematic sectional illustration of a fourth embodiment of a separating wall 5 according to the invention for a power circuit 1 in the region of a wall opening 6. The wall opening 6 is able to be at least partially closed by an opening closure 7, the opening state thereof being a function of the pressure differential. The opening closure 7 by way of an elastic connection region 11 is connected to a separating wall region of the separating wall which is adjacent to the wall opening 6 that is able to be at least partially closed by the opening closure 7. The higher the pressure differential, the more the opening closure 7 is opened the larger thus the aerodynamically effective opening area of the wall opening 6.

The separating wall 5 is produced by 3D printing. The separating wall 5 here is printed onto a carrier component 13, for example. In this way, the number of individual parts is reduced and the assembly is facilitated.

Features of the exemplary embodiments illustrated in FIGS. 2 to 4 can be freely combined with one another, in particular between the exemplary embodiments illustrated in FIGS. 2 to 4. Furthermore, the separating wall 5 can have a basic shape that deviates from that of a hollow cylinder.

While the invention has been explained and described in more detail by preferred exemplary embodiments, the invention is not limited by the disclosed examples, and other variations can be derived therefrom by the person skilled in the art without departing from the scope of protection of the invention.

The invention claimed is:

1. A separating wall for dividing a heating volume of a power circuit, the separating wall comprising:

a separating wall structure disposed to divide the heating volume into a first sub-volume and a second sub-volume;

said separating wall structure being formed with at least one wall opening which enables a gas flow between said first and second sub-volumes;

said wall opening having an aerodynamically effective opening area which is a function of a pressure differential between a pressure in the first sub-volume and a pressure in the second sub-volume; and said at least one wall opening being configured as a meandering flow duct between said first and second sub-volumes, and said meandering flow duct having a flow resistance element configured to be elastically deflected by a gas flow flowing in said flow duct.

2. The separating wall according to claim 1, comprising at least one opening closure configured to close said wall opening at least partially, wherein an opening state of said opening closure is the function of the pressure differential between the pressure in the first sub-volume and the pressure in the second sub-volume.

3. The separating wall according to claim 2, further comprising a spring element generating a restoring force on said at least one opening closure, the restoring force being the function of the pressure differential, said spring element being coupled to a separating wall region of said separating wall structure adjacent said wall opening that is to be at least partially closed by said opening closure.

4. The separating wall according to claim 2, wherein said at least one opening closure is connected by way of an elastic connection region to a separating wall region of said separating wall structure adjacent said wall opening that is to be at least partially closed by said opening closure.

5. The separating wall according to claim 1, wherein said separating wall structure has a substantially hollow-cylindrical shape.

6. The separating wall according to claim 1, wherein at least external surfaces of the separating wall structure are made from polytetrafluoroethylene (PTFE).

7. A method for producing the separating wall, the method comprising printing the separating wall structure according to claim 1 by way of 3D printing.

8. The method according to claim 7, which comprises printing the separating wall structure onto a carrier component.

9. A power circuit, comprising the separating wall according to claim 1 disposed to divide the heating volume of the power circuit into two sub-volumes.

10. A separating wall for dividing a heating volume of a power circuit, the separating wall comprising:

a separating wall structure disposed to divide the heating volume into a first sub-volume and a second sub-volume;

said separating wall structure being formed with at least one wall opening which enables a gas flow between said first and second sub-volumes; and said wall opening having an aerodynamically effective opening area which is a function of a pressure differential between a pressure in the first sub-volume and a pressure in the second sub-volume; and at least one wall reinforcement embedded in said separating wall structure, said at least one wall reinforcement being made of a reinforcement material which is of a greater strength than a surrounding material in which said wall reinforcement is embedded.

11. The separating wall according to claim 10, wherein said at least one wall opening is configured as a meandering flow duct between said first and second sub-volumes.

12. The separating wall according to claim 11, wherein said meandering flow duct has a flow resistance element configured to be elastically deflected by a gas flow flowing in said flow duct.

* * * * *